No. 870,901. PATENTED NOV. 12, 1907.
J. PEIGNON.
MACHINE FOR THE MANUFACTURE OF WIRE NETTING OR LATTICED FENCES
WITH BARS OF ALL DESCRIPTION.
APPLICATION FILED SEPT. 21, 1904.

Witnesses:
Helen Wechsler
Christine Keeley

Inventor
Joseph Peignon.
By H. H. de Vos.
Attorney.

No. 870,901. PATENTED NOV. 12, 1907.
J. PEIGNON.
MACHINE FOR THE MANUFACTURE OF WIRE NETTING OR LATTICED FENCES WITH BARS OF ALL DESCRIPTION.
APPLICATION FILED SEPT. 21, 1904.

No. 870,901. PATENTED NOV. 12, 1907.
J. PEIGNON.
MACHINE FOR THE MANUFACTURE OF WIRE NETTING OR LATTICED FENCES WITH BARS OF ALL DESCRIPTION.
APPLICATION FILED SEPT. 21, 1904.

Inventor:
Joseph Peignon.
By H. H. deVas
Attorney.

Witnesses:

No. 870,901. PATENTED NOV. 12, 1907.
J. PEIGNON.
MACHINE FOR THE MANUFACTURE OF WIRE NETTING OR LATTICED FENCES
WITH BARS OF ALL DESCRIPTION.
APPLICATION FILED SEPT. 21, 1904.

No. 870,901. PATENTED NOV. 12, 1907.
J. PEIGNON.
MACHINE FOR THE MANUFACTURE OF WIRE NETTING OR LATTICED FENCES
WITH BARS OF ALL DESCRIPTION.
APPLICATION FILED SEPT. 21, 1904.

Witnesses:

Inventor:
Joseph Peignon.
By H H de Vas.

Attorney.

UNITED STATES PATENT OFFICE.

JOSEPH PEIGNON, OF NANTES, FRANCE.

MACHINE FOR THE MANUFACTURE OF WIRE-NETTING OR LATTICED FENCES WITH BARS OF ALL DESCRIPTION.

No. 870,901.　　　　　Specification of Letters Patent.　　　　Patented Nov. 12, 1907.

Application filed September 21, 1904. Serial No. 225,356.

*To all whom it may concern:*

Be it known that I, JOSEPH PEIGNON, a citizen of the French Republic, and resident of Nantes, France, have invented an Improved Machine for the Manufacture of Wire-Netting or Latticed Fences with Bars of All Description, of which the following is a specification.

This invention relates to a machine for making trellis and open work fencings with bars of all kinds.

In the annexed drawings given by way of example:

Figure 3:
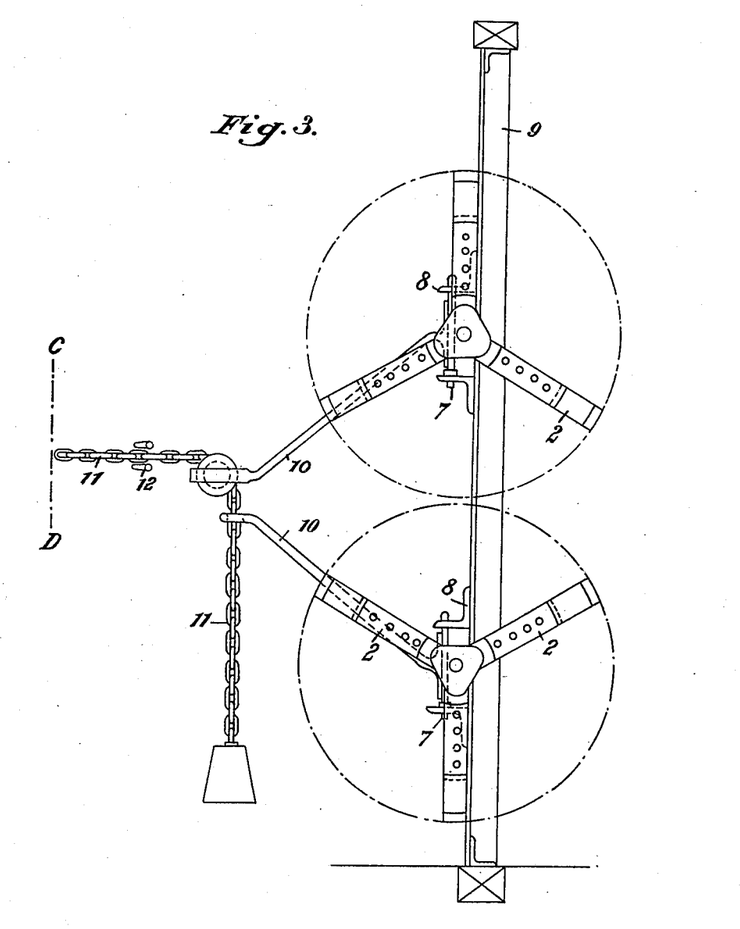
Fig. 3 a side view of the appliance upon which are placed the coils of wire.
Figure 6:
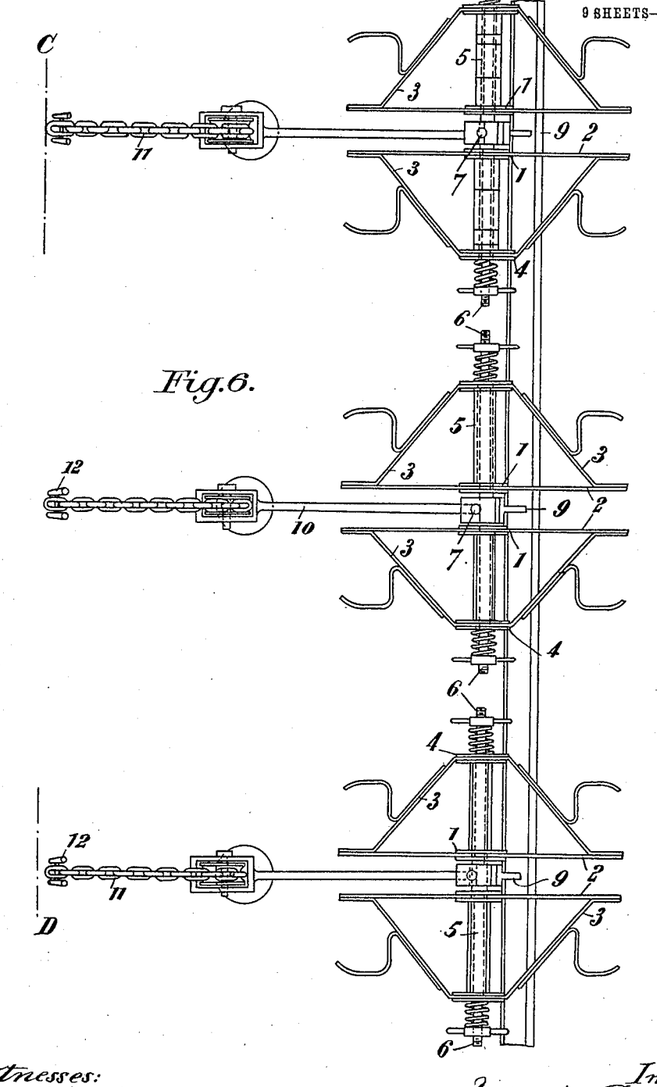
Fig. 6 a plan view of Fig. 3.
Figure 8:
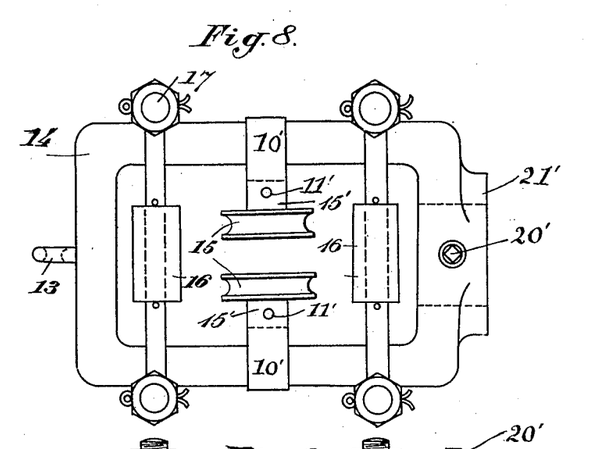
Figs. 8, 9, 10 show, on a larger scale, respectively a side, a plan and an elevation view of the differential regulator of tension arranged at the front part of the machine.
Figure 9:
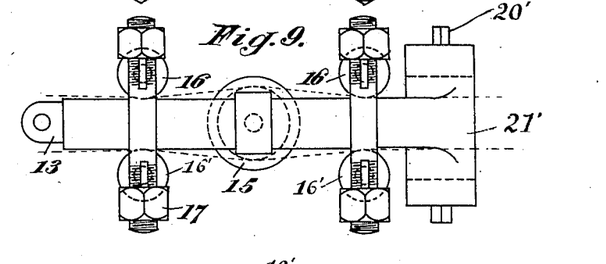
Figure 10:
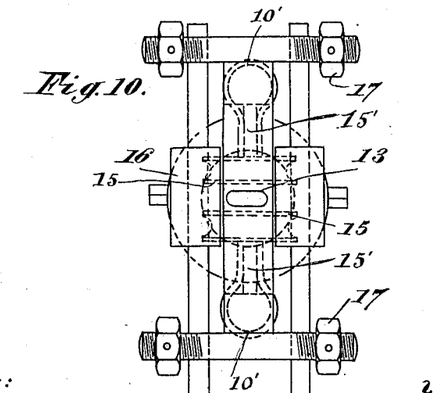

The wire to be laced round the fencing bars arrives at the factory in coils and is fixed upon the reels more than one for each separate twisting device shown in Figs. 3 and 6. Any number of these reels can be employed for instance 4 as in the presen tcase. They are composed of a three branch star, the arms 2 whereof fixed to a plate 1 are provided upon the exterior with braces 3 having the form of a Z, which are riveted, on the one hand upon the free arms, and on the other to the plates 4. At the outer end of the braces are placed claw shaped hooks (Fig. 6) which may be adjusted as required, so as to adapt them to the diameter of the coil of wire to be unwound. The plates 3 and 4 are connected together by a socket 5 sliding easily over each of the ends of a horizontal shaft 6. The latter is suitably fixed to a vertical pivot 7 which rotates in bearings 8 fixed to the uprights 9. From each pivot 7 (there being in the present example two of them for four reels) leads an arm 10; these arms are bent respectively downwards and upwards, the first one being furnished with a grooved pulley and the latter with an eye through which passes a chain 11, passing over the said grooved pulley and provided, at its end, with a balance weight. The links of this chain should be as short as possible, in order to assure its tension round its longitudinal axis. It is provided at regular intervals with conical eyelets 12 serving to better guide the wire unwinding from the reels 2, 3. The eyelets are conical to assure the easy passage of the wire which sometimes is very much bent. The end of the chain placed close to the machine proper is connected by elongated links to the eyelet 13 of a device hereinafter called the differential tension regulator (Figs. 8, 9 and 10). This regulator comprises a rectangular frame 14, on the central portion of the two side-bars of which are spring yoke pieces 10' as shown in Fig. 10, to which the ends of two short shafts 15' are secured by suitable bolts 11', and at
the other ends of each of these short shafts is revolubly mounted a grooved guide wheel 15 to receive the wires on the top of periphery thereof from underneath the top set of rollers 16 and pass them on to the other top set of rollers 16 from beneath which they pass to the twisters, the rollers 16 being revolubly mounted upon suitable shafts supported by the frame 14. In like manner the two bottom wires are passed over and on top of the lower set of rollers 16' as shown in Fig. 9. The distance between the rollers 16 and 16' may be changed and regulated by proper adjustment of the nuts 17, so as to lower or raise the said rollers in order to adjust the tension on the wires. After passing over the last rollers 16 or 16' the wires pass through the hollow shaft to the twisters hereinafter described, the differential tension regulator being secured rigidly upon the hollow shaft by set screws 20' in the boss 21', so as to rotate therewith. The operation of the regulator is as follows: The four wires to be twisted having been rove through the same, the top wires pass in the manner described over the tops of the wheels 15 and the bottom wires pass underneath these wheels. Now if one wire should catch on the reel by kinking, binding or otherwise, this will draw back its particular wheel 15. This drawing back will cause the other wheel 15 to tilt with the first one and the loose wires will be braked. By this device an even running of the four wires is automatically effected, for as the tension upon the two wheels 15 varies, they see-saw as it were, each braking the other both sidewise and up and down when necessary, and it is only when all four wires are running at the same tension that either wheel runs true in the direct path of the wire-feed.

Figure 4:
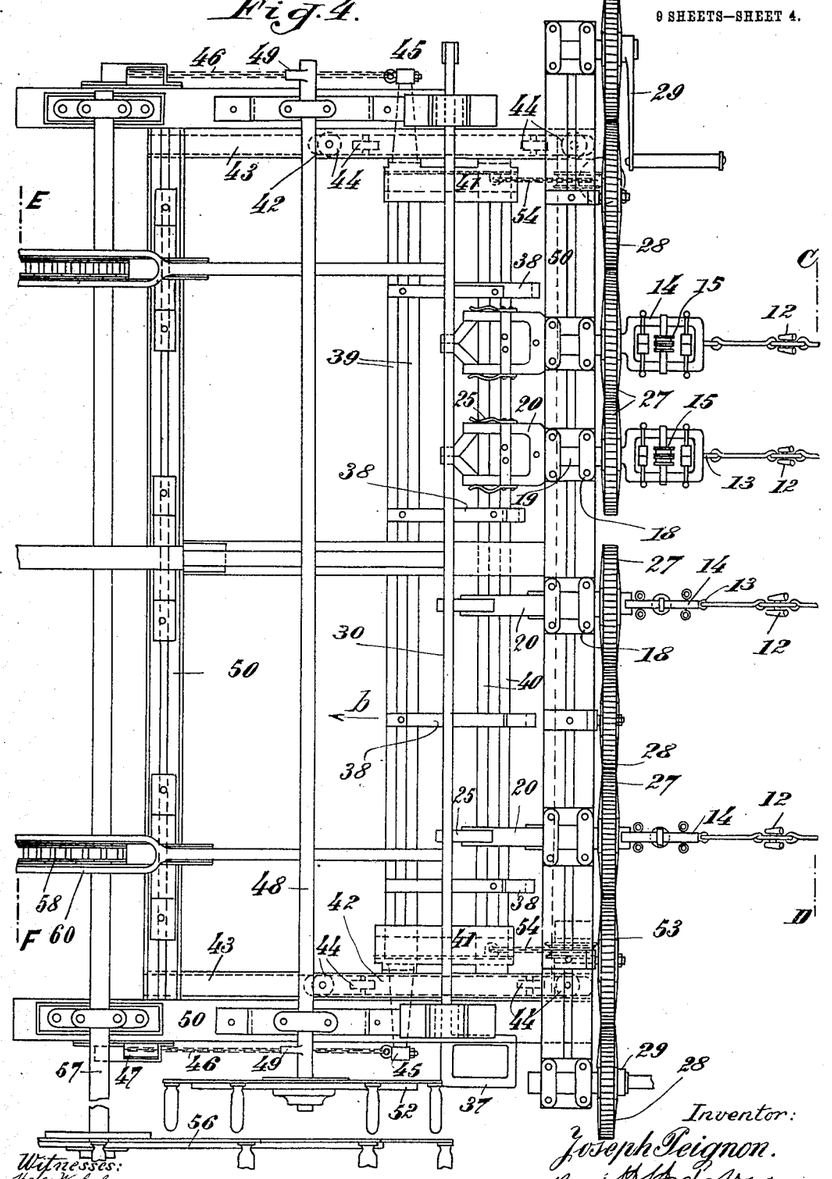
Fig. 4 a plan view of Fig. 1.
Figure 5:
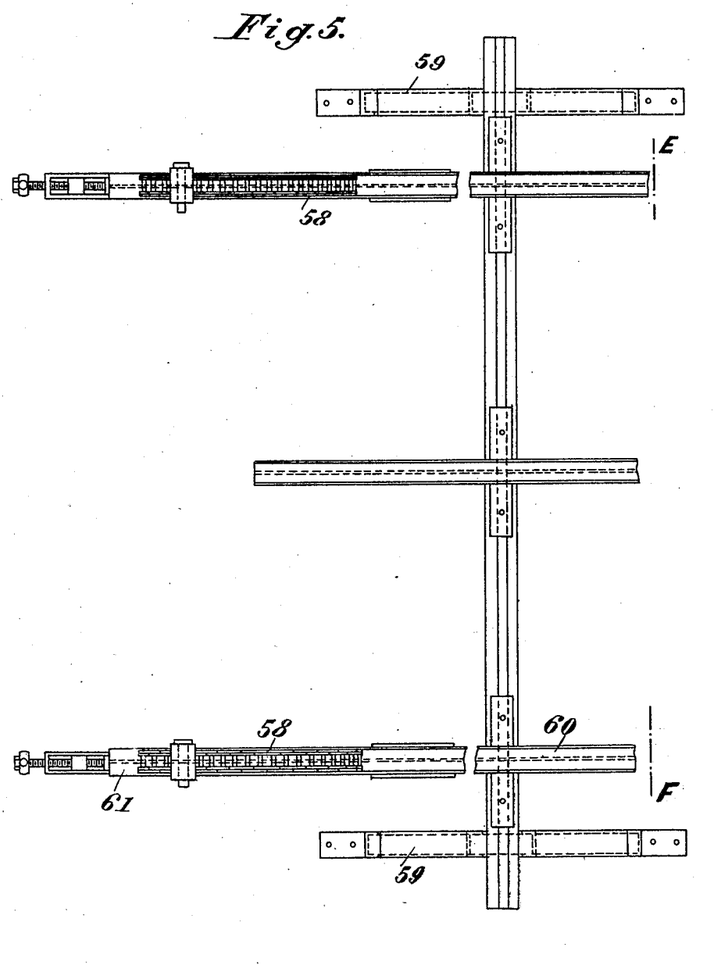
Fig. 5 a plan view of Fig. 2.
Figure 11:
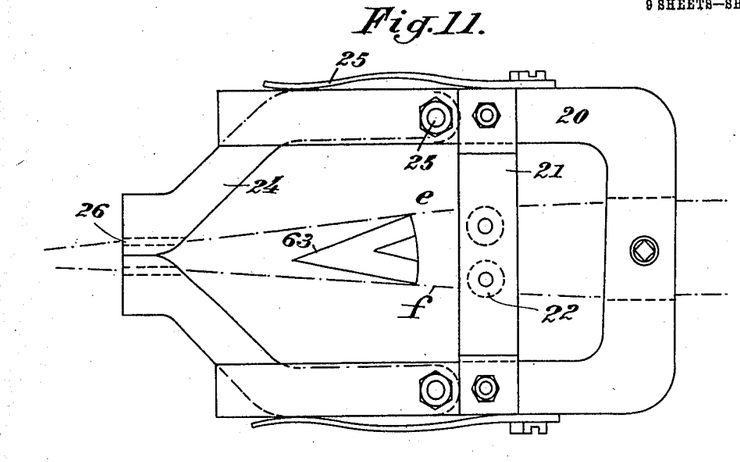
Figs. 11, 12, 13 show similar views of the means for twisting the wire.
Figure 12:
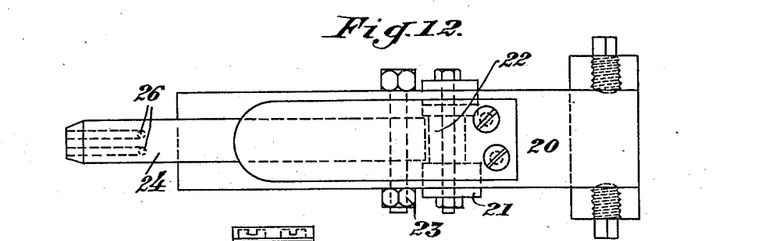
Figure 13:
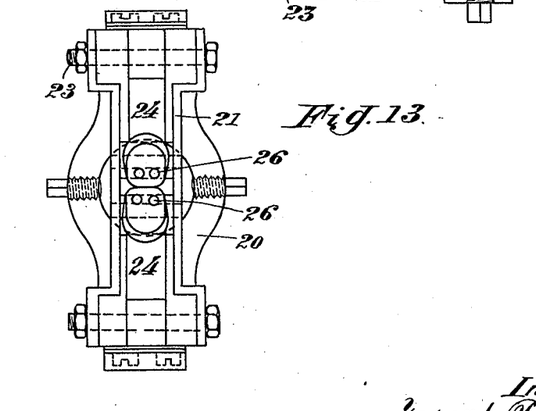

As it has already been stated, the shaft is hollow *i. e.* it is provided with one or more longitudinal bores. The rear portion is provided with a U shaped frame 20 called "the twister" and is shown in detail in Figs. 11, 12, 13. This frame comprises two lateral cross pieces 21, between which are arranged two loose pulleys 22, intended to properly guide the wires. The free ends of the frames are slotted in their common plane and in each slot thus formed vibrates upon a bolt 23 an arm or jaw-piece 24 which is continually held by a flat spring 25 in the position shown in Figs. 4 and 11 against its fellow and constitutes with such fellow jaw-piece a kind of clip. The front free end of each jaw-piece is pierced longitudinally with two holes 26, through each pair of which freely pass the two wires from the particular pair of reels, top or bottom as the case may be. By this arrangement when the wooden or other cross-bars 63 are first inserted between the upper and lower wires these jaw-pieces will spring apart, but may as the operation proceeds be tightened down upon the bars, as hereinafter set forth. Finally so as to be able to set the twister 20 rotating as well as its shaft and the regulator, each shaft is provided between the regulator and the bearing 18, with a cylindrical toothed wheel 27; the different wheels 27 are connected together by means of intermediate wheels 28, the outermost of which is provided with a cranked handle 29. The twisters coupled together in pairs (Fig. 4) are in the form illustrated, and are operated by two cranked handles 29 each acting upon a pair of twisters through the intervention of suitable gear wheels as shown in Fig. 4. Anyhow it is more advantageous to connect at the free space, the two sets of rollers by means of an intermediate wheel and to control all the twisters from a single place. However the second crank can be controlled by an assistant. As before stated, the bearings 18 are laterally adjustable, so as to be able to suit their separating distance to the distances a (Fig. 5) of the fencing wires.

Across the machine or twisters, the number whereof can be varied, is placed a tightening device resembling a clip (Fig. 7) and the jaws whereof 30 engage and tighten upon, at a given moment, the front ends of the jaws 24. The jaws have the shape of elongated bars connected on the one hand by means of an intermediary lever 32 oscillating round a bolt 31 and on the other hand by means of a lever 33 which can also rotate round a bolt 31. Its longer arm, furnished with several holes is connected by a link 34 to the pedal lever 36 oscillating round a bolt 35 and the free end whereof is enlarged in order to constitute the pedal plate 37.

Figure 7:
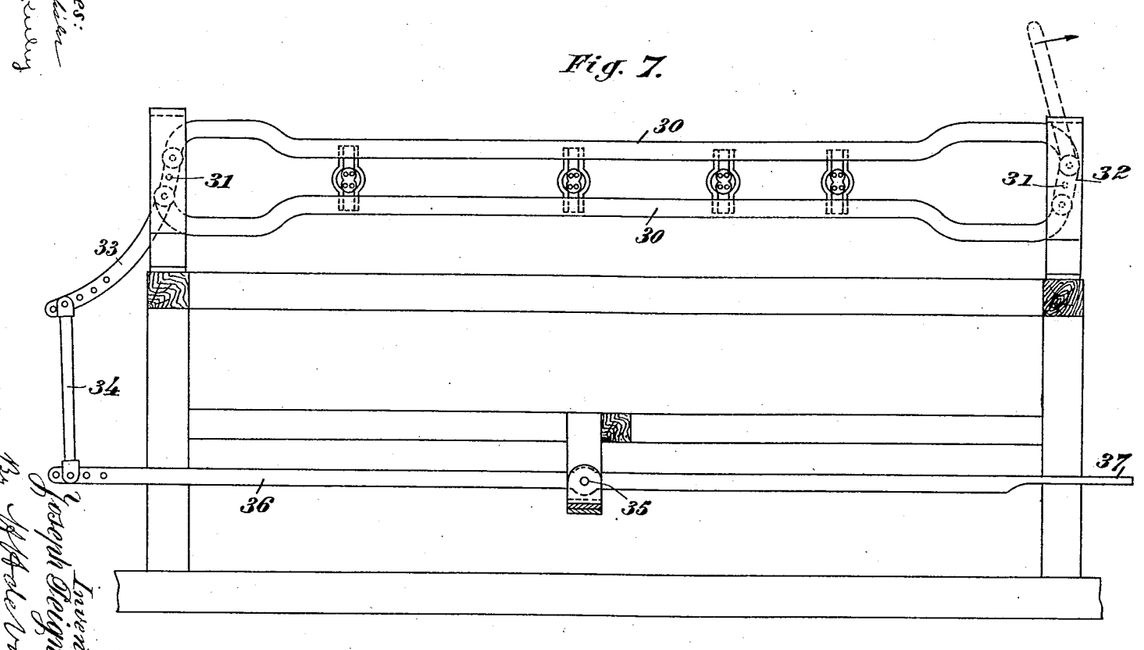
Fig. 7 a section of a clamping device on line A—B of Fig. 1.

In the normal position, the jaws are open (Fig. 7). When a pressure is exerted upon the pedal 37, the longer arm 33 oscillates upwardly, the shorter arm descends, whereby the two bars 30 are brought together, which consequently firmly tighten down upon the jaws 24 of the twisters. If the effect of this tightening is to be increased, the lever 32 is lengthened by an arm shown by dotted lines in Fig. 7 and which is drawn in the direction of the arrow.

Between the twisters is placed, at suitable intervals, a certain number of plugs 38 furnished with a pressure plate (Figs. 1 and 4), the object twhereof will be set forth hereinafter. The plugs are L shaped, the big end whereof is fixed upon a rolling carriage. The latter consists of two pairs of U irons 39, 40 connected together by metal plate 41. The outer bars 42, arranged parallel to the plates 41 are each furnished with a pair of horizontal rollers and one of vertical rollers 44 to more easily guide the carriage in the slides 43 connected to the frame of the machine.

To a suitable part of the carriage is fixed an eye bolt 45, directed downwardly and in the eye whereof slides a longitudinally adjustable bolt constituting the last link of a chain 46, which, passing over the guide roller 47, is attached to the cranked handle 49 keyed upon the shaft 48. This shaft rotates in two bearings 51 fitted upon the frame 50 of the machine.

Figure 1:
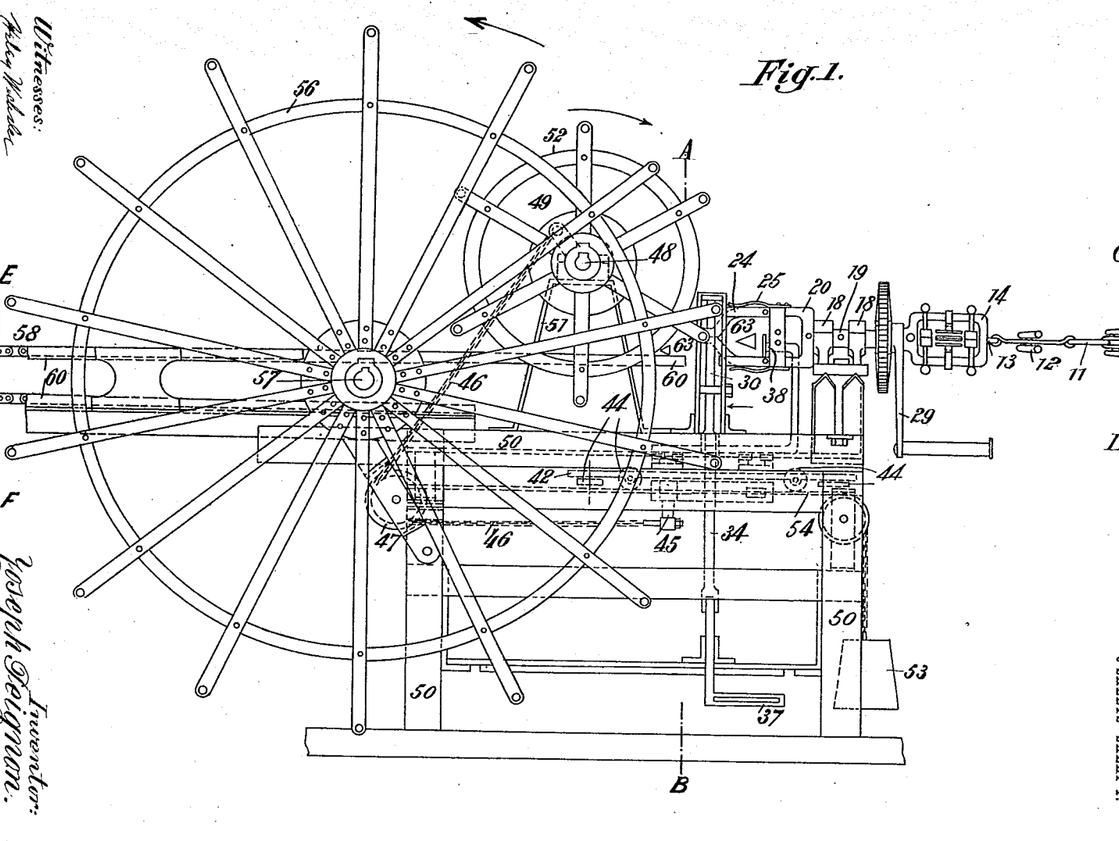
Figure 1 shows a side view of this machine.

52 is a hand wheel which, when rotated in the direction of the arrow, winds up the chain 46 and causes the carriage 39, 40 to advance in the direction of the arrow b (Fig. 4). A chain 54 connected to the back end of the carriage and furnished with a balance weight 53 causes the said carriage to return automatically into its normal position (Figs. 1 & 4).

The bolt fitted in the eye of the eye bolt 45 is adjustable, so as to be able to exactly adjust the advance of the carriage as well as the control of the carriage itself.

Figures 2, 14:
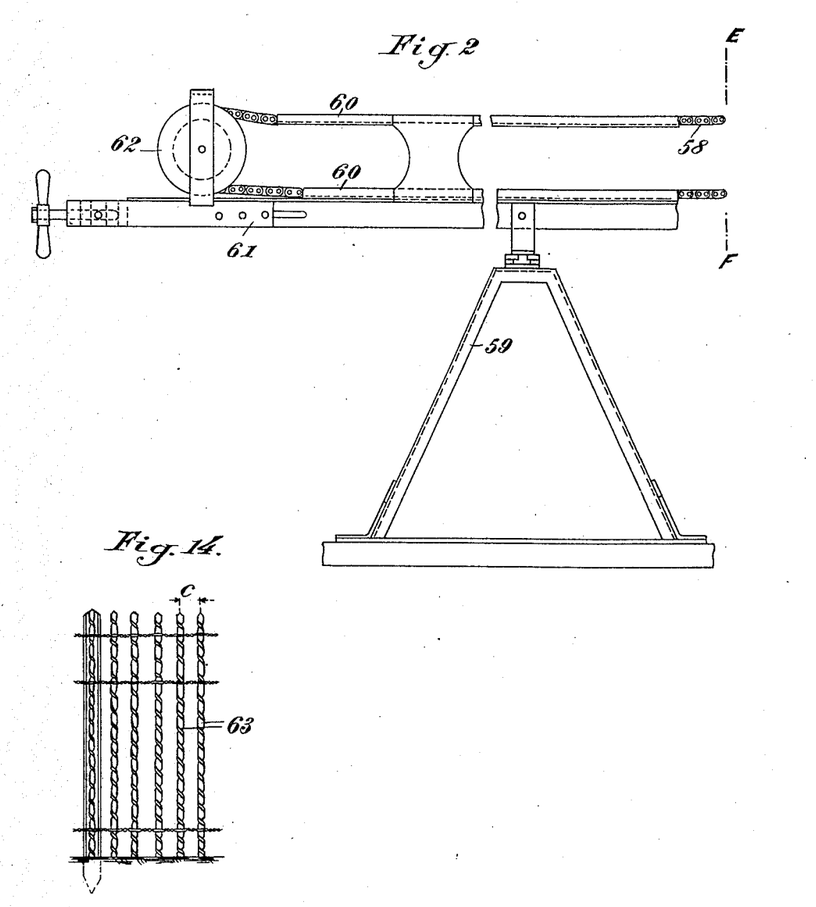
Fig. 2 a similar view of its rear portion detached from Fig. 1.
Fig. 14 is a view of a short section of one form of fence made by the machine herein described.

In front of bearings 51 other bearings 55 are arranged upon the lateral side pieces of the frame of the machine and in them bears a shaft 57 provided with a handwheel 56 as well as two chain wheels not shown on the drawings and over which passes an endless sprocket chain 58. This chain runs in guides 60 arranged partly on the machine and partly on trestles 59 (Figs. 2, 5) and connected together by stays of metal plate. The tension and return of the chain are obtained by guide rollers 62 adjustable in the rails 61. Finally, so as to easily understand the operation of the machine, we will follow the different steps in the manufacture of a fencing of metal wire.

The reels, the number whereof varies with that of the fencing wire to be produced, are supplied with coils of wire, and, the ends of the wires (4 in this case) are led along the chains 11 through the eyelets into which they are introduced alternately in pairs. Supposing that during this preparatory operation a coil of wire does not, for a minute, unwind properly. The result is that the wire is stretched and that the pair of drums corresponding thereto oscillate round the vertical bolt 7. The right or left hand drum seeks to move with the coil carried by it in the central plane of the chains, the traction upon the entangled wire is consequently exerted more directly, while the other wire is as it were braked; its drum being separated from the central plane of the chain. When in the meanwhile the entangled wire has become untangled, it is again properly unwound and the pair of reels again takes up its central position. The effect is therefore the same as that produced by the before described differential regulator 14, when a wire does not unwind properly and stops and becomes entangled. Arrived at the last named device two of the four wires passing along the chain from each side of the frame 14, are placed between the rollers 16; they are passed singly over the grooved pulleys 15 and then between the second pair of rollers 16. The wires are then drawn through the hollow shaft and thus arrive in the twister 20. Here they again bend in pairs over the rollers 22 and finally leave the twister by the passages 26. The ends of the wires are allowed to project a certain distance beyond the twister; eventually they can be temporarily knotted round a fencing bar placed in the guide piece 60 and the object whereof is to simply prevent the wires participating in the rotation instead of being twisted together in pairs. It is at this instant that the interlacing proper starts which may be continued, as required, so as to furnish a fencing of metal wire connecting bars of wood or iron, rough or worked. For this purpose, a bar (of wood for instance) 63 (Figs. 1 and 11) is placed in the twisters between the two pairs of wires e, f held apart by the pulleys 22 and shown by dotted lines in Fig. 11. The hand wheel 52 is then rotated in the direction of the arrow, so as to cause the carriage 39, 40 with the plug 38 to advance, which pushes by means of the plate the bar through the spring jaws 24 and cause it to leave the frame 20 which at the present minute is in a vertical position. The distance at which the bar must be stopped in front of the ends of the head of the checks 24 depends upon the distance c (Fig. 14) between two neighboring fencing bars. At this instant the pedal 37 is lowered, the result whereof is to bring together the jaws 24 maintained separated by the stretched wires and to firmly tighten the wires against the bar. Almost at the same instant the handle 29 is rotated (for instance to the left). The four wires are then twisted together and the bar is interlaced at as many points as there are series of wires along the chains. The first bar is consequently suitably fixed; it is attached, by means of hooked rods etc., to a link of the endless sprocket chain which serves solely to move forward the finished fencing and to advance the series of wires for a certain length equal to the distance from the front edge of one bar to the like edge of the next abutting bar, which will be equivalent to the distance between the centers of such bars, as shown at c in Fig. 14. This result is obtained by rotating the hand wheel 56 in the direction of the arrow. When this is done after a bar has been enlaced, another bar is placed between the wires, at the spot indicated, the carriage 39, 40 caused to advance and simultaneously the bar, close the tightening device and simultaneously the crank 29 is rotated, but this time in the opposite direction to the previous movement (consequently to the right). If operations were not carried on in this manner, the chains 11 would go on twisting and would finish by preventing any further rotation. By proceeding in the manner above set forth, this inconvenience is avoided, because the chains are sometimes twisted together, sometimes untwisted. The next bar has consequently been enlaced; the hand-wheel 56 is again rotated, a third bar is introduced and so on.

In order to have an idea of the whole machine, the divisional lines C D & E F can be superposed upon the different figures.

Having now particularly described and ascertained the nature of my said invention and in what manner the same is to be performed I declare that what I claim is:—

1. In a device of the class described a plurality of wire-reels arranged in double pairs, a differential tension regulating device for receiving the wires from each pair of reels, a twisting device to which the wires pass from each tension regulator, means for feeding bars to the wires, and means for rotating the twisters and tension regulators first in one direction and then in the other.

2. In a device of the class described a plurality of wire-reels arranged in double pairs, a differential tension regulating device for receiving the wire from each pair of reels, a twisting device to which the wires pass from each tension regulator, means for feeding bars to the wires, and means for rotating the twisters and tension regulators.

3. In a device of the class described, a plurality of wire-reels arranged in double pairs, a differential tension regulating device for receiving the four wires from each double pair of reels, a twisting device to which the wires pass from each tension regulator, means for feeding bars to the wires and means for rotating the twisters and tension regulators of adjacent double pairs of reels simultaneously in different directions.

4. In a device of the class described, a plurality of wire-reels arranged in double pairs, a differential tension regulating device for receiving the four wires from each double pair of reels, a twisting device to which the wires pass from each tension regulator, means for feeding bars to the wires, and means for rotating the twisters and tension regulators of adjacent double pairs of reels simultaneously in different directions and then reversely.

5. In a device of the class described a plurality of wire-reels arranged in double pairs, a differential tension regulating device for receiving the wires from each pair of reels, a twisting device to which the wires pass from each tension regulator, means for feeding bars to the wires, means for tightening the wire upon the bars, and means for rotating the twisters and tension regulators first in one direction and then in the other.

6. In a device of the class described, a plurality of wire-reels arranged in double pairs, a differential tension regulating device for receiving the wire from each pair of reels, a twisting device to which the wires pass from each tension regulator, means for feeding bars to the wires, means for tightening the wire upon the bars, and means for rotating the twisters and tension regulators.

7. In a device of the class described, a plurality of wire-reels arranged in double pairs a differential tension regulating device for receiving the wire from each pair of reels, a twisting device to which the wires pass from each tension regulator, means for feeding bars to the wires, means for tightening the wire upon the bars, and means for rotating the twisters and tension regulators of each adjacent pair of wire-reels simultaneously in different directions.

8. In a device of the class described, a plurality of wire-reels arranged in double pairs, a differential tension regulating device for receiving the four wires from each double pair of reels, a twisting device to which the wires pass from each tension regulator, means for feeding bars to the wires, means for tightening the wire upon the bars, and means for rotating the twisters and tension regulators of adjacent double pairs of reels simultaneously in different directions and then reversely.

9. In a device of the class described, a support, a shaft pivoted at the center to the support, a wire-reel revolubly mounted upon either end of the shaft, an axle having two reels similarly arranged located adjacent to the shaft and reels first mentioned, twisting devices and a flexible connection between the twisting devices and the reel-shafts whereby the latter will under certain conditions be vibrated upon the pivot points.

10. In a device of the class described, a support two horizontal shafts hinged at the center to the support at different levels, a wire-reel revolubly mounted upon either end of each shaft, a securing nut upon the outer end of each shaft, a spring interposed between the adjacent reel and the nut, a lever secured to each shaft adjacent to its pivot, a pulley on one lever and a ring on the other, a chain having wire-guide links passing over the pulley of one lever and through the ring of the other, a weight on the end of the chain and twisting mechanism connected with the other end of the chain.

11. In a device of the class described, a support, two horizontal shafts pivoted to the support at different levels, a wire-reel revolubly mounted upon either end of each shaft, a lever secured to each shaft adjacent to its pivot, a chain passing vertically through the ends of both levers, a weight on the lower end of the chain, and twisting mechanism connected with the other end of the chain.

12. In a device of the class described, a differential tension regulator comprising a rectangular frame, two sets of rollers, one set located at either end to receive and deliver two sets of wires each, and two regulating grooved wheels over the peripheries of which the wires run from the rollers at one end to the rollers at the other end each revolubly mounted upon a shaft pivotally secured at an end to the frame by suitable springs.

13. In a device of the class described, a differential tension regulator comprising a rectangular frame, two sets of rollers, one set located at either end to receive and deliver the wires, and two regulating grooved wheels over the peripheries of which the wires run each revolubly mounted upon a shaft supported in the frame between the other rollers in such manner as to be capable of movement in any direction when the wire tension of any one wire varies from that of the others.

14. In a device of the class described, a plurality of wire-reels arranged in double pairs, a differential tension regulating device for receiving the wire from each pair of reels, a twisting device to which the wires pass from each tension regulator, means for feeding bars to the wires, means for intermittently moving the finished web onward and drawing out the wire to be twisted, and means for rotating the twisters and tension regulators first in one direction and then in the other.

15. In a device of the class described, a plurality of wire-reels arranged in double pairs, a differential tension regulating device for receiving the wire from each pair of reels, a twisting device to which the wires pass from each tension regulator, means for feeding bars to the wires, means for intermittently moving the finished web onward and drawing out the wire to be twisted, and means for rotating the twisters and tension regulators.

16. In a device of the class described, a plurality of wire-reels arranged in double pairs, a differential tension regulating device for receiving the four wires from each double pair of reels, a twisting device to which the wires pass from each tension regulator, means for feeding bars to the wires, means for intermittently moving the finished web onward and drawing out the wire to be twisted, and means for rotating the twisters and tension regulators of adjacent double pairs of wire-reels simultaneously in different directions.

17. In a device of the class described, a plurality of wire-reels, divided into sets, means for varying the planes of rotation of the reels of each set, a differential tension regulating device for receiving the wires from each set of reels, a twisting device to which the wires pass from each tension regulator, means for feeding bars to the wires, and means for rotating the twisters and tension regulators first in one direction and then in the other.

In testimony whereof I have hereunto set my hand in presence of two witnesses.

J. PEIGNON.

Witnesses:
H. D. BENNETT,
YVES LE MEIGNEN.